Dec. 11, 1934.  A. F. COOKE  1,983,521
CONTROLLING MECHANISM, ESPECIALLY FOR GREENHOUSE VENTILATORS
Filed May 8, 1933  2 Sheets-Sheet 1

Inventor
Alfred F. Cooke
By
Attorney

Dec. 11, 1934.  A. F. COOKE  1,983,521
CONTROLLING MECHANISM, ESPECIALLY FOR GREENHOUSE VENTILATORS
Filed May 8, 1933  2 Sheets-Sheet 2

Inventor
Alfred F. Cooke
By
Attorney

Patented Dec. 11, 1934

1,983,521

UNITED STATES PATENT OFFICE 1,983,521

CONTROLLING MECHANISM, ESPECIALLY FOR GREENHOUSE VENTILATORS

Alfred F. Cooke, Pittsburgh, Pa.

Application May 8, 1933, Serial No. 669,812

1 Claim. (Cl. 236—49)

This invention relates to control mechanism especially as automatically operated.

This invention has utility as a ventilator operator for greenhouses.

Referring to the drawings.

Figure 1:
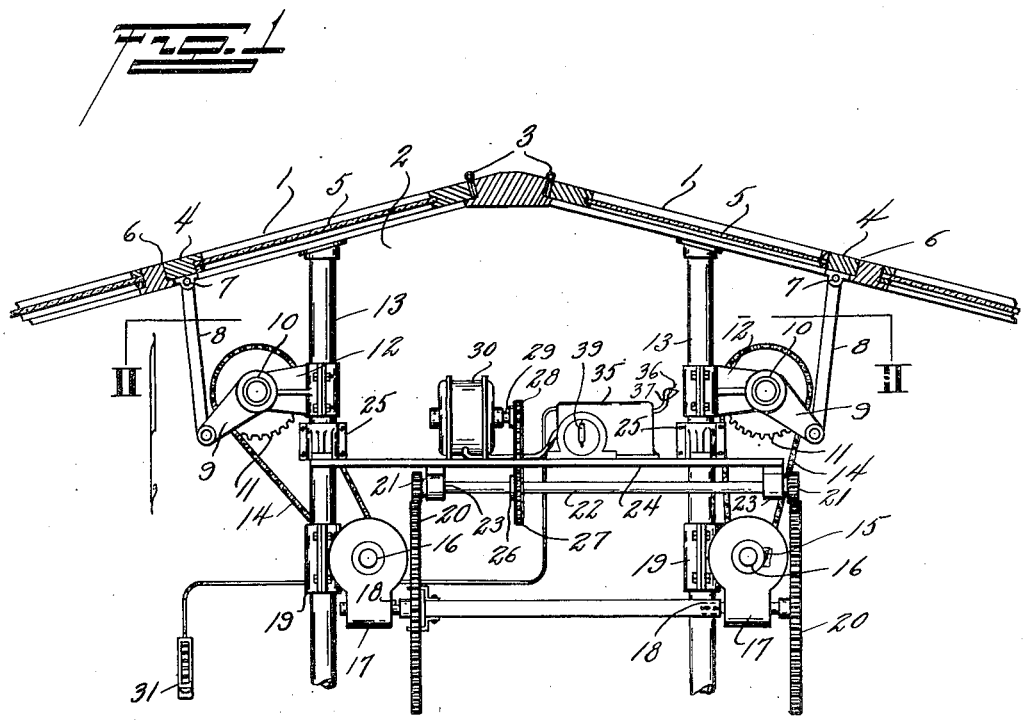
Fig. 1 is a fragmentary view of a greenhouse having an embodiment of the invention incorporated therewith.
Figure 2:
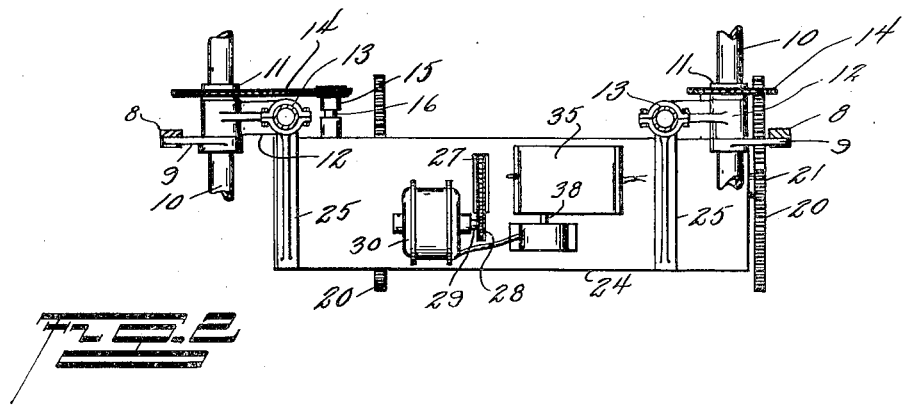
Fig. 2 is a section on the line II—II, Fig. 1.
Figure 3:
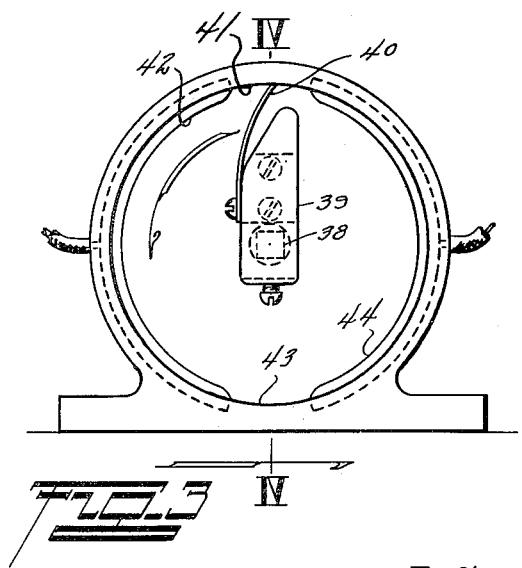
Fig. 3 is an end view of a switch in the control device of Fig. 1.
Figure 4:
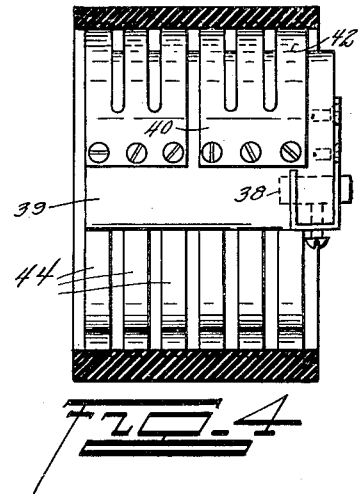
Fig. 4 is a section on the line IV—IV, Fig. 3.
Figure 5:
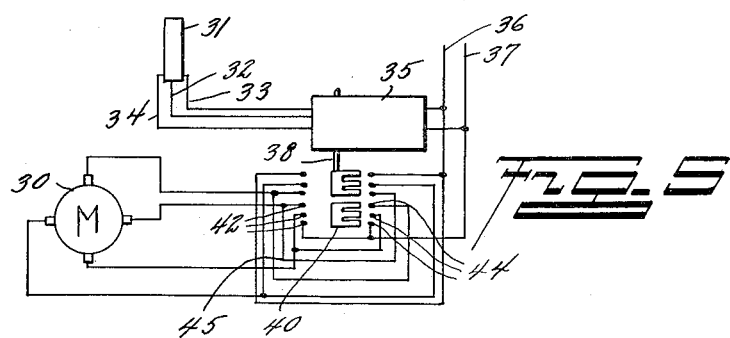
Fig. 5 is a wiring diagram of the control devices.
Figure 6:
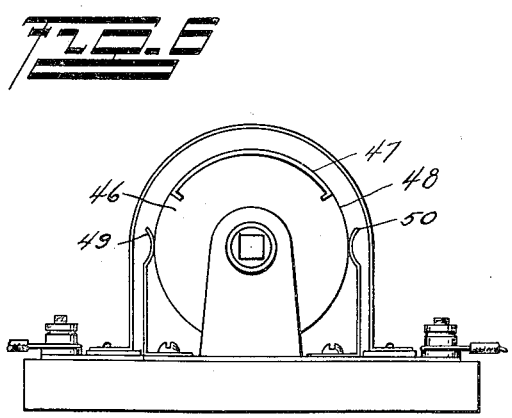
Fig. 6 is a view of a drum switch instead of the finger type as shown in Fig. 3.
Figure 7:
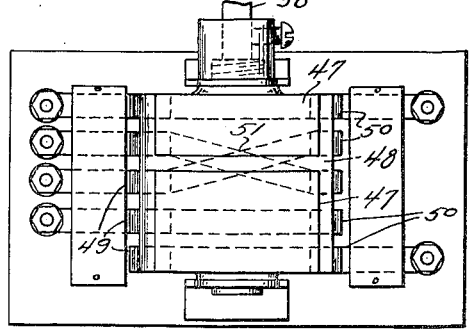
Fig. 7 is a plan view of the switch of Fig. 6, with the cover removed.

Roof 1 of glass may house the greenhouse interior 2. This roof 1 is shown as having hinges 3 mounting frames 4 carrying glass 5. These frames 4 are shiftable relatively to the roof 1 of the greenhouse out of openings 6 to permit the ascent of warm air from the greenhouse interior, and thereby provide for ventilation. The frames 4, remote from the hinges 3 have pins 7 from which depend links 8 to arms 9 on shafts 10, fixed with sprocket wheels 11. The shafts 10 are mounted in brackets 12 carried by uprights 13 as roof supports for the greenhouse. From the sprocket wheels 11 extend sprocket chains 14 to sprocket wheels 15 on shaft 16, having worm gear speed reduction 17 to shaft 18. Brackets 19 on the columns 13 mount the shafts 16. Upon the shaft 18 there may be actuating means for the greenhouse ventilators.

In practice these may have been large hand wheels. However, under the invention herein, the shaft 18 is provided with gears 20 in mesh with pinions 21 on shaft 22 mounted in brackets 23 from deck 24 fixed by brackets 25 with the uprights 13. Mounted on this shaft 22 is sprocket wheel 26 having sprocket chain 27 therefrom to sprocket wheel 28 on shaft 29 of power motor 30 on the deck 24.

In the operation of the greenhouse, importance attaches to holding the temperature at a desired point. Operation of the venilators provides a quick means for temperature drop by opening up the roof. Hereunder, this may be controlled automatically, for at a desired location in the greenhouse interior 2 is located thermostat 31 having main lead 32 thereto with hot or too high temperature cut off connection 33 and low or too cold temperature conductor line 34 therefrom. These are shown as extending to housing 35, to which electric current supply lines 36, 37, extend. With the electric current supply from the line 36 to the line 32 for the thermostat 31; at the condition of temperature rise, the thermostat 31 is effective to connect the line 32 with the line 33 thereby operating thermostatic motor in the housing 35. This motor housing 35 has shaft 38 protruding therefrom carrying arm 39 and spring contacts 40.

At the position of the cutting in for the motor in the housing 35 all of the spring switch contacts 40 are in off position 41. The thermostat 31 has effected a by-pass to start the motor in the housing 35, thereby bringing the series of contacts 40 against the conductor segments 42, respectively effective to cut in the motor field and the motor armature for the motor 30.

There is thus effected a period of operation for the motor 30 continuing until off portion 43 is reached, when cut out is effective for the line 33 as well as the entire system for the motor 30. Accordingly, the thermostatic motor in the housing 35 and the motor 30 discontinue operation. This period of operation of the motor 30 through the speed reduction gearing 29, 28, 27, 21, 20, 17, 15, 14, 11, swings the arm 9 upward to open the ventilator by lifting sash 4 on its hinge 3. This permits the warm air in the upper portion of the greenhouse readily to escape for lowering of the temperature in the greenhouse. As such temperature lowers, the thermostat 31 may have its action effective through line 34 to connect up the motor in the housing 35 to again operate the arm 39, this time over segments 44. Between the segments 42 and 44, the armature reversing cross-over 45 is thus effective for operating the motor 30 in the reverse direction from the opening. This effects a lowering of the sash 4 into the initial or closed position. When such position is reached, the contacts 40 have moved off the segments 44 into off position 41, not only disconnecting the lines to the motor 30, but the line 34 to the thermostat 31 is rendered ineffective while line 33 is reconnected so that as the temperature again rises, the thermostat 31 may be effective for a repetition of this cycle of operation.

The controls for the motor in the housing 35 respectively at the limit of throw rendering line 33 in circuit to the thermostat and line 34 out of circuit or vice versa, are incidental to such thermostat motor and its operation in connection with the thermostat, and thus may be independent of the control switch herein.

Instead of having movable contacts 40 and segments 42, 44, stationary, the switch may be conversely arranged and have mounted on the shaft 38, a drum 46 having segments 47 with insulation gap 48 therefrom. Contacting with these segments 47 may be spring contacts 49 during one cycle of operation and spring contacts 50 during the second cycle of operation, with the cross-over connection 51 to effect the reversal in operation of the power motor 30.

It is accordingly apparent there is herein provided a simple control for operating greenhouse ventilators or as an automatic control device.

The relay motor and switch operating mechanism 35 may be one of the many types now on the market as for example the device shown in Gold Patent No. 1,454,635, of May 8, 1923.

What is claimed and it is desired to secure by Letters Patent is:

A ventilator, a control system therefor responsive to temperature conditions comprising a motor, a shaft driven by said motor, a control for the motor including a thermostat having electrical contacts for making and breaking a circuit to said motor at predetermined temperatures, said thermostat governing the control to rotate said shaft 180° in the same direction at the making of each contact, a switch comprising a series of contacts, conductor segments mounted by said shaft, a second motor controlled by said segments progressively contacting predetermined groups of said contacts to operate said second motor in alternate directions at each 180° rotation of said shaft, speed reducing means operable by said second motor, and linkage from said speed reducing means to open and close said ventilator.

ALFRED F. COOKE.